(12) United States Patent
Wang et al.

(10) Patent No.: US 8,365,267 B2
(45) Date of Patent: Jan. 29, 2013

(54) SINGLE USE WEB BASED PASSWORDS FOR NETWORK LOGIN

(75) Inventors: Tak Yin Wang, Los Altos, CA (US); Patrick Wong, Milpitas, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1112 days.

(21) Appl. No.: 12/270,785

(22) Filed: Nov. 13, 2008

(65) Prior Publication Data

US 2010/0122331 A1   May 13, 2010

(51) Int. Cl.
G06F 7/04 (2006.01)
G06F 15/16 (2006.01)
G06F 17/30 (2006.01)
H04L 29/06 (2006.01)

(52) U.S. Cl. ............ 726/8; 726/2; 726/3; 726/4; 726/5; 726/1; 726/16; 726/17; 726/21; 726/26; 713/182; 713/183; 713/184; 713/185; 725/30; 711/164; 707/694; 710/28; 709/229

(58) Field of Classification Search ........... 728/9; 726/9
See application file for complete search history.

(56) References Cited

U.S. PATENT DOCUMENTS

| | | | |
|---|---|---|---|
| 6,052,709 A | 4/2000 | Paul | |
| 6,393,465 B2 | 5/2002 | Leeds | |
| 6,421,709 B1 | 7/2002 | McCormick et al. | |
| 6,453,327 B1 | 9/2002 | Nielsen | |
| 6,643,686 B1 | 11/2003 | Hall | |
| 6,650,890 B1 | 11/2003 | Irlam et al. | |
| 6,772,196 B1 | 8/2004 | Kirsch et al. | |
| 6,957,259 B1 | 10/2005 | Malik | |
| 2004/0177110 A1 | 9/2004 | Rounthwaite et al. | |
| 2004/0255122 A1 | 12/2004 | Ingerman et al. | |
| 2007/0016941 A1* | 1/2007 | Gonzalez et al. | 726/9 |
| 2008/0141345 A1* | 6/2008 | Gavrilos et al. | 726/4 |
| 2010/0017860 A1* | 1/2010 | Ishida | 726/7 |

OTHER PUBLICATIONS

U.S. International Searching Authority, Notification of Transmittal of the International Search Report and the Written Opinion of the International Searching Authority, or the Declaration, dated Jan. 31, 2006.
2nd TIPPI Workshop, Trustworthy Interfaces for Passwords and Personal Information, Security Skins: The Design and Evaluation of Unspoofable, Embedded Security Indicators [slides], Jun. 19, 2006, *Rachna Damija*, Harvard University.
Rachna Dhamija et al., Why Phishing Works, Apr. 2006.
Rachna Dhamija et al., The Battle Against Phishing: Dynamic Security Skins, Jul. 2005.
Registration Demonstration; Sign-in From New Device; Sign-in Demonstration.
D. Kristol et al., Memo re: HTTP Statement Management Mechanism, Network Working Group Request for Comments: 2109, Standards Track, Feb. 1997.

* cited by examiner

*Primary Examiner* — Nathan Flynn
*Assistant Examiner* — Bryan Wright
(74) *Attorney, Agent, or Firm* — Frommer Lawrence & Haug LLP; John W. Branch (57) ABSTRACT

Embodiments are directed towards employing a plurality of single use passwords to provide phishing detection and user authentication. A user receives a plurality of single use passwords that expire within a defined time period after having been sent to a registered device. During a login attempt, the user enters a user name and a requested one of the passwords, which once entered expires. If valid, the user then enters a portion of another password to complete a displayed portion of a password, and a specified other one of passwords. If the displayed portion of the other passwords does not match any portion of one of passwords, then the user may detect a phishing attempt and terminate the login. If the user correctly the password data, the user may then access secured data. Each new login request requires a different set of passwords to be used.

20 Claims, 7 Drawing Sheets

SINGLE USE WEB BASED PASSWORDS FOR NETWORK LOGIN

TECHNICAL FIELD

The present invention relates generally to computing security, and more particularly but not exclusively to providing a plurality of single use temporary passwords from which a user is to provide at least a subset to become authenticated during a login request.

BACKGROUND

A major type of internet fraud, today, is known as phishing. Phishing typically involves the practice of obtaining confidential information through the manipulation of legitimate users. Typically, the confidential information is a user's password, credit card details, social security number, or other sensitive user information. Phishing may be carried out by masquerading as a trustworthy person, website, or business. In one approach, a message may be sent to an unsuspecting user. The message may include a link or other mechanism that links to an illegitimate source. In another approach, a webpage that may appear to be legitimate is provided to the user. However, the webpage (or message) is designed to trick the user into providing their confidential information, including such as their user name, password, or the like. Such webpages (or messages) may relate to account log-in sites, credit card entry sites, or the like. Once the unsuspecting user enters their information, the phisher may be able to obtain the sensitive information and use it to create fake accounts in a victim's name, ruin the victim's credit, make purchases under the victim's name, sell the information to others, perform acts under the victim's identity, or even prevent the victim from accessing their own money and/or accounts.

Unfortunately, this type of fraudulent activity is becoming more popular, primarily because of how easy it is to convince people to divulge their sensitive information over the internet. It has been estimated that between May 2004 and May 2005, for example, over one million computer users in the United States suffered over $900 million in losses due to such fraudulent phishing schemes. Because victims to these attacks may reduce their activities over the internet with websites that have been phished, many legitimate busineses may also suffer both financially, and in their reputation.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The terms "sensitive," and "confidential" information refer to any information that a user would prefer not to be widely distributed. Such information may be something that the user knows, such as their social security number, a password, encryption key number, credit card number, financial information, driver's license number, insurance number, mother's maiden name, or the like. The information may also represent data about the user, including, for example, their age, birth date, medical information, or the like.

Briefly, the present invention is directed towards employing a plurality of single use passwords to provide phishing detection and user authentication. A user may initially register a user name and device, such as a mobile device, that is to receive a plurality of single use passwords. In one embodiment, the plurality of single use passwords is configured to expire within a defined time period after having been sent to the registered device. Within the defined time period, the user may access a login page over a network that requests the user to provide a user name or other identifier and one of the provided plurality of single use passwords. If the user provides a valid user name and the one requested single use password, within the time period, the provided one single use password expires. The user may then be presented with another page that provides a portion of another one of the plurality of single use passwords, and requests that the user also enter a specified other one of the plurality of single use passwords, where the specified other single use password may be selected by a password service based on an ordered position in the plurality of single use passwords sent to the user's device. If the provided portion of the other one of the plurality of single use passwords does not match any portion of one of the plurality of single use passwords, then the user may determine that the page is associated with a phishing attempt. The user may then elect to terminate the login attempt. Otherwise, if the user correctly completes the missing portion of the other single use password, and enters the specified other single use password, the user may be enabled to access secure data. For each subsequent login, the user receives a different plurality of single use passwords, which again have expiration times.

In traditional approaches, when a user's password is compromised, the phisher in general might be able to gain virtually unlimited access to the user's confidential and/or sensitive information. That is because once the phisher has the user's password, they may be able to use it multiple times, and often at multiple different network sites. Moreover, with access to the user's password, the phisher might have a capability to modify the user's password, thereby thwarting the user's ability to access the user's information. Once the phisher has the user's password, there is often no readily available mechanism to revoke the password in real time.

The present invention is directed toward minimizing phishing attempts. That is, by using the approach described herein, users may not only be authenticated, but phishing attempts may be more readily detected by the users. By using the approach described herein, the phisher is less likely to be able to access secure passwords, or other confidential information from the user. In one embodiment, this is because the plurality of single use passwords are configured to expire either after a first use, and/or after a defined time period after having been sent to the user's registered device. Thus, even if a phisher does access at least some of the plurality of single use passwords, such passwords expire after a defined time period. Moreover, the requested passwords requested may not be the same passwords requested for a second login attempt. This is because the user receives a new plurality of single use passwords for each login requested.

Illustrative Operating Environment

Figure 1:
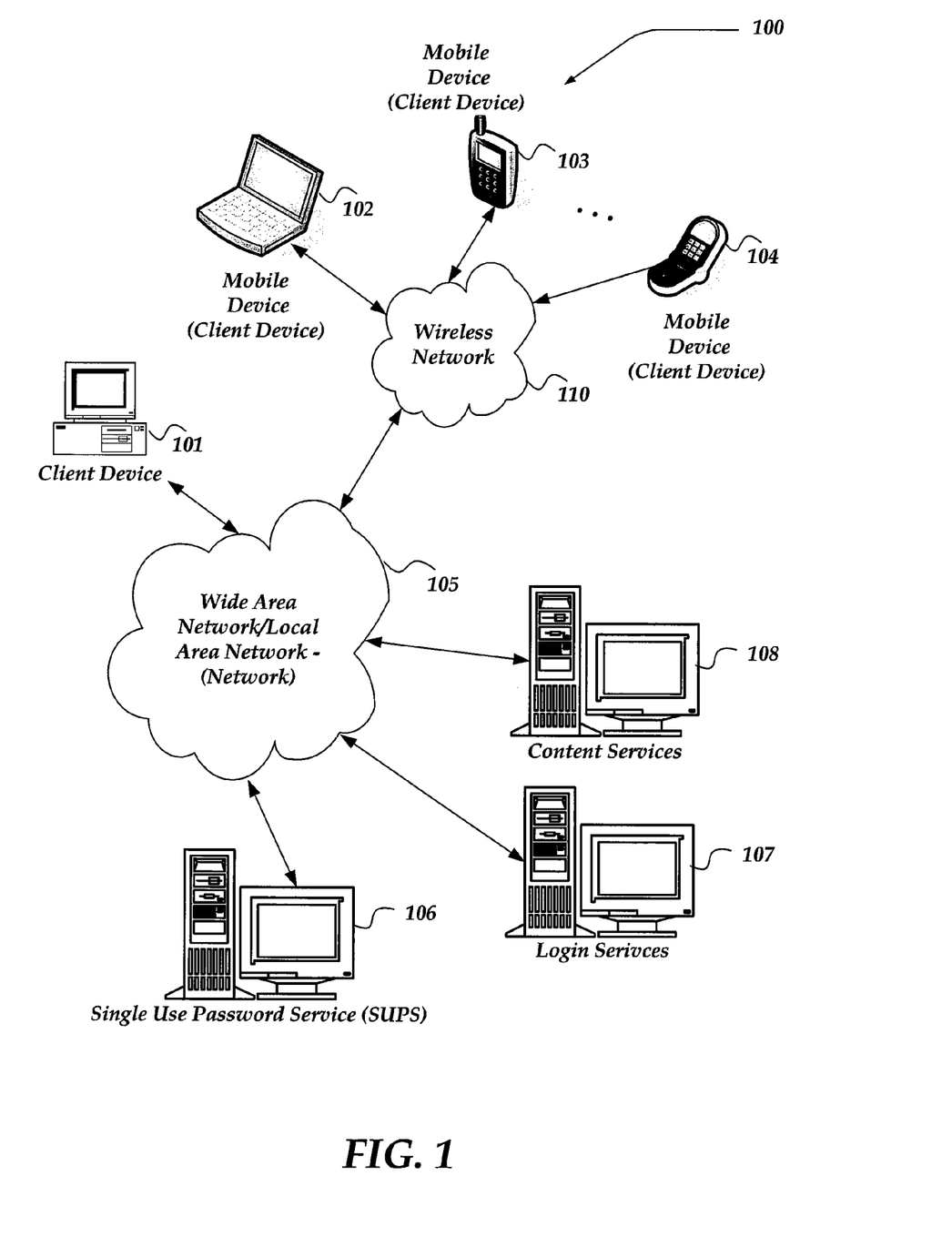
FIG. 1 shows a functional block diagram illustrating an environment for practicing the invention.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")–(network) 105, wireless network 110, Single Use Password Service (SUPS) 106, client devices 101-104, login services 107, and content services 108.

One embodiment of client devices 102-103 is described in more detail below in conjunction with FIG. 2. Generally, however, client devices 102-104 may include virtually any portable computing device capable of receiving and sending a message over a network, such as network 105, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing search queries, or the like. Client device 101 may also include client applications such as those described above, as well as being configured to provide location information.

The set of such devices may include devices that typically connect using a wired or wireless communications medium such as personal computers, multiprocessor systems, microprocessor-based or programmable consumer electronics, network PCs, or the like. Moreover, at least some of client devices 102-104 may operate over wired and/or wireless network.

A web-enabled client device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to request a plurality of single use passwords over a network, and/or access secured content. However, another application may also be used to perform a request the plurality of single use passwords over the network. In one embodiment, a user might register for use of the single use plurality of passwords using one client device, and register to receive the plurality of single use passwords by another client device. In one embodiment, the user might specify the receiving device to be virtually any computing device capable of receiving content over a network.

Client devices 101-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, client devices 101-104 may uniquely identify themselves through any of a variety of mechanisms, including a phone number, Mobile Identification Number (MIN), an electronic serial number (ESN), or other client device identifier. The information may also indicate a content format that the mobile device is enabled to employ. Such information may be provided in a network packet, or the like, sent to SUPS 106, content services 108, login services 107, or other computing devices.

Client devices 101-104 may further be configured to include a client application that enables the end-user to log into an end-user account that may be managed by another computing device, such as content services 108, SUPS 106, or the like. Such end-user account, for example, may be configured to enable the end-user to receive emails, send/receive IM messages, SMS messages, access, and/or modify selected web pages, participate in a social networking activity, perform activities associated with sensitive and/or confidential information, or the like.

In one embodiment, a user of client devices 101-104 might access content from content services 106 by performing a login using a plurality of single use passwords. In one embodiment, the user might register to use the single use passwords through login services 107. The user may, during registration provide a user name, and an identifier for a computing device to receive the plurality of single use passwords. In one embodiment, specification of the computing device might include providing a network identifier of the computing device. However, in another embodiment, the user might specify the computing device by specifying a messaging address for which the plurality of single use passwords is to be sent. For example, the user might register the computing device by specifying an email address, an SMS address, IM address, VOIP address, or the like. Moreover, the registered computing device might be one of client devices 101-104.

During registration, in one embodiment, login services 107 might seek to perform a validation of the registered receiving computing device. For example, in one embodiment, a test message, confirmation message, or the like, might be sent to the registered computing device. The user might then be requested to reply to the message using a variety of mechanisms, within a specified time period. For example, the message sent to the registered computing device might include a hash, code, or the like, that is to be sent to login services 107 for confirmation.

In one embodiment, registration may be performed using a web browser. However, the invention is not limited to such interface, and other mechanisms may be employed. For example, registration may be performed using IM, SMS, MMS, VOIP, or the like. Moreover, the confirmation message may be sent to the registered computing device using a browser interface, SMS, VOIP, phone call, IM, or the like. Thus, the invention is not limited to a particular communication protocol or mechanism for registration and/or confirmation.

Wireless network 110 is configured to couple client devices 102-104 and its components with network 105. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd VOIP (2G), 3rd VOIP (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 105 is configured to couple network devices with other computing devices, including, SUPS 106, content services 108, client device 101, login services 107, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of login services 107 is described in more detail below in conjunction with FIG. 3. Briefly, however, login services 107 may include any computing device capable of connecting to network 105 to receive and manage requests for registration and use of single use passwords.

In one embodiment, login services 107 receives requests for registration to employ single use passwords to access secured information, such as might be managed through content services 108, or the like. Login services 107 may perform a confirmation activity to validate a computing device registered to receive a plurality of single use passwords for a given user name. In one embodiment, the user name might be associated with a specific set of secured information, a particular secured service, or the like. Thus, a registering user might have multiple user names, accounts, or the like, for which they seek to use the single use passwords. In one embodiment, the user might register each of these services, sites, or the like, separately. However, the invention is not so limited, and the user may also specify for which content/services the registration is to be applied.

In any event, in one embodiment, during registration, login services 107 might enable a user to specify actions to be taken should the registered computing device is lost, stolen, damaged, or otherwise compromised. For example, login services 107 might enable a user to specify a friend, family member, or the like, as a contact, useable to authenticate the user and allow the user to change a password, user name, a registered receiving client device, or the like. For example, should the user determine that their receiving computing device is stolen, the user might request from their contact a special additional password, code, or the like, useable to enable the user to change where the plurality of single use passwords are to be sent, or the like. In this manner, the user may be authenticated by the contact, thereby providing a cross-check through known relationships. The invention is not limited to this mechanism, however, and other mechanisms may also be employed for enabling a registered user to manage lost computing devices, and/or other situations that might require changing registration information about the user. For example, the login services 107 might present the user with multiple secret questions/answers, such as "what is the name of your favorite vacation spot?," "what is your dog's name?," or the like. Correct responses to the multiple secret questions from the user might then allow the user to make changes to their registration information through login services 107. In another embodiment, the user might be requested to contact a customer service for lost computing devices and/or other suspected security compromises.

When a user is registered, login services 107 may interact with content services 108, and SUPS 106. In one embodiment, when a user seeks access to secured content/services from content services 108, the user may be presented with a web page, or other interface managed through login services 107. In one embodiment, the user might be re-directed to login services 107 to perform a login. However, in another embodiment, information provided by the user during a login attempt might be securely provided to the login services 107 by content services 108.

In any event, login services 107 may, upon receiving a user name for the user, perform a validation of the user. For validated users, login services 107 may then be configured to send a request to SUPS 106 to have a plurality of single use passwords be sent to the registered computing device. The user may then employ the received plurality of single user passwords to complete the login including confirming that the login site being used is not a phishing site. One embodiment of a process useable to enable login using a plurality of single use passwords is described in more detail below in conjunction with FIG. 5.

Devices that may operate as login services 107 include various network devices, including, but not limited to personal computers desktop computers, multiprocessor systems, microprocessor-based or programmable consumer electronics, network PCs, servers, network appliances, and the like.

One embodiment of SUPS 106 is described in more detail below in conjunction with FIG. 4. Briefly, however, SUPS 106 may include any computing device capable of connecting to network 105 to receive a request for a plurality of single use passwords and to provide the single use passwords to a registered computing device. The single use passwords may be provided to the registered computing device using any of a variety of communication protocols, or mechanisms, including but not limited to email, SMS, IM, MMS, VOIP, or the like. In one embodiment, a special application might be provided to the registered computing device to receive and display to a user the plurality of single use passwords.

SUPS 106 may generate the plurality of single use passwords using any of a variety of mechanisms. For example, in one embodiment, SUPS 106 might generate the single use passwords based use of pseudo-random generators. In one embodiment, the plurality of single use passwords may include a set of five passwords. However, the plurality may include more or less passwords than five. For example, in another embodiment, four to seven passwords might be included in the plurality. The passwords may include strings of numbers and/or symbols. In one embodiment, each password may be between 4-7 numbers and/or symbols in length. However, the invention is not limited to lengths of these values, and other lengths may also be employed.

SUPS 106 may further specify a duration of time before which the plurality of single user passwords is to expire. In one embodiment, the time period might commence when SUPS 106 sends the passwords to the registered computing device, and last for a defined time period of between 60-90 seconds. However, other time periods may also be used. Moreover, once a user is determined to have used a password, the password is expired.

Devices that may operate as SUPS 106 include various network devices, including, but not limited to personal computers desktop computers, multiprocessor systems, microprocessor-based or programmable consumer electronics, network PCs, servers, network appliances, and the like.

Although FIG. 1 illustrates SUPS 106 and login services 107 as distinct computing devices, the invention is not so limited. For example, functionality of SUPS 106 and login services 107 may also be provided using a single network device, without departing from the scope of the invention. Moreover, in another embodiment, functionality of SUPS 106 may also be performed in part or in full within content services 108. Thus, it should be understood that other configurations are envisaged, and therefore, the invention should not be construed as being limited by the arrangement illustrated in FIG. 1.

Content services 108 represents any of a variety of network devices to provide content and/or services accessible by client devices 101-104. Such services and/or content may include, but are not limited to email and/or other messaging content, personal sites, financial services, medical information, or the like. Content managed through content services 108 may also include, but is not limited sensitive and/or confidential information that a user might request to have protected through an authentication mechanism. In one embodiment, content services 108 might therefore be configured to interact with login services 107 to provide protection using a plurality of single use passwords.

Devices that may operate as content servers 107-18 include personal computers desktop computers, multiprocessor systems, microprocessor-based or programmable consumer electronics, network PCs, servers, and the like.

Illustrative Client Device

Figure 2:
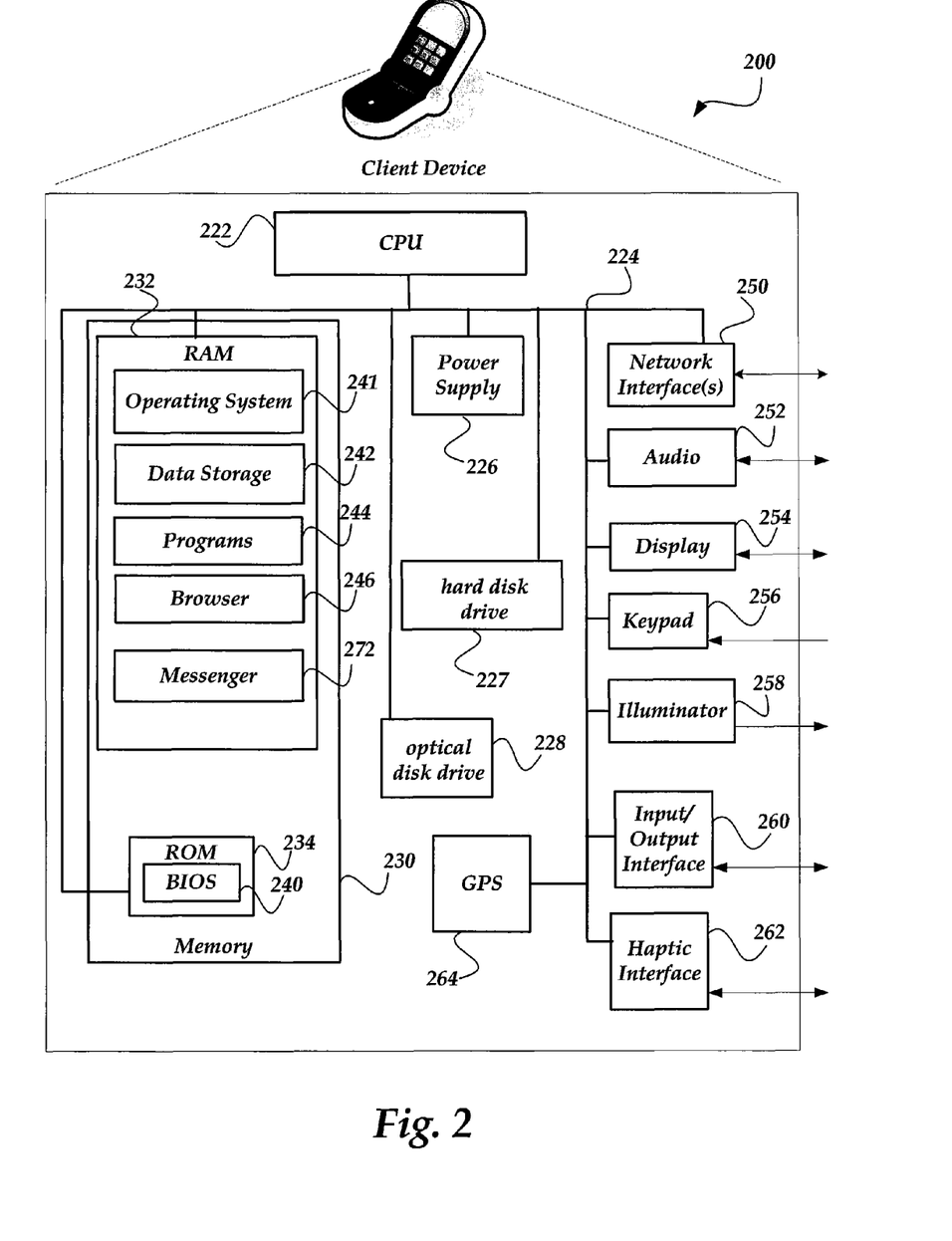
FIG. 2 shows one embodiment of a client device that may be employed.

FIG. 2 shows one embodiment of client device 200 that may be included in a system implementing the invention. Client device 200 may represent one embodiment of client devices 102-104 of FIG. 1. In one embodiment, client device 200 may represent a computing device that a user may register to receive the plurality of single use passwords. However, client device 200 may also represent a computing device, such as client devices 101-104 of FIG. 1, useable to perform a login and access secured information/services over a network. It should be noted, that while it might be desirable for security reasons to register a computing device that is distinct from the computing device that a user employs to login and access secured information, the invention is not so limited. Thus, a user might employ the same computing device to receive the plurality of single use passwords, and to perform a login.

In any event, client device 200 may include many more or less components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, an optional audio interface 252, a display 254, a keypad 256, an illuminator 258, an input/output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and the like.

Audio interface 252 is arranged to produce and receive audio signals such as the sound of a human voice, music, or the like. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Client device 200 may further include additional mass storage facilities such as optical disk drive 228 and hard disk drive 227. Hard disk drive 227 is utilized by client device 200 to store, among other things, application programs, databases, and the like. Additionally, optical disk drive 228 and hard disk drive 227, a flash memory, or the like may store cookies, data, images, or the like.

Keypad 256 may comprise any input device arranged to receive input from a user (e.g. a sender). For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, mouse, stylus, or other input or output devices. Input/output interface 260 can utilize one or more communication technologies, such as USB, infrared, Bluetooth™, and the like. Optional haptic interface 262 is arranged to provide tactile feedback to a user (e.g. a sender) of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include an interface with a Java virtual machine module that enables control of hardware components and/or operating system operations via Java application programs.

Memory 230 further includes one or more data storage 242, which can be utilized by client device 200 to store, among other things, programs 244 and/or other data. For example, data storage 242 may also be employed to store information that describes various capabilities of client device 200. The information may then be provided to another device based on any of a variety of events, including being sent as part of a header during a communication, sent upon request, and the like. Moreover data storage 242 may be used to store information such as data received over a network from another computing device, data output by a client application on client device 200, data input by a user of client device 200, or the like. For example, data storage 242 may include data, including cookies, and/or other client device data sent by a network device. Data storage 242 may also include a plurality of single use passwords received over a network. Moreover, although data storage 242 is illustrated within memory 230, data storage 242 may also reside within other storage mediums, including, but not limited to optical disk drive 228, hard disk drive 227, or the like.

Programs 244 may also include computer executable instructions which, when executed by client device 200, transmit, receive, and/or otherwise process messages and enable telecommunication with another user of another client device. Other examples of application programs include calendars, contact managers, task managers, transcoders, database programs, word processing programs, security programs, spreadsheet programs, games, CODEC programs, and so forth. In addition, mass memory 230 stores browser 246, and messenger 272.

Browser 246 may be configured to receive and to send web pages, forms, web-based messages, and the like. Browser 246 may, for example, receive and display (and/or play) graphics, text, multimedia, audio data, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Browser 246 may also be configured to communicate with a network device, or the like, for use requesting and/or managing access to secured data, requesting registration for use of and for receiving a plurality of single use password.

Messenger 272 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 272 may be configured as an IM application, such as AOL Instant Messenger, Yahoo! Messenger, .NET Messenger Server, ICQ, or the like. In another embodiment, messenger 272 may be a client application that is configured to integrate and employ a variety of messaging protocols. Moreover, messenger 272 may be configured to include an interface that may request and/or receive a plurality of single use passwords. Moreover, client device may employ a process such as described below in conjunction with FIG. 6 to manage access to secured information using a plurality of single use passwords.

Illustrative Network Devices

Figure 3:
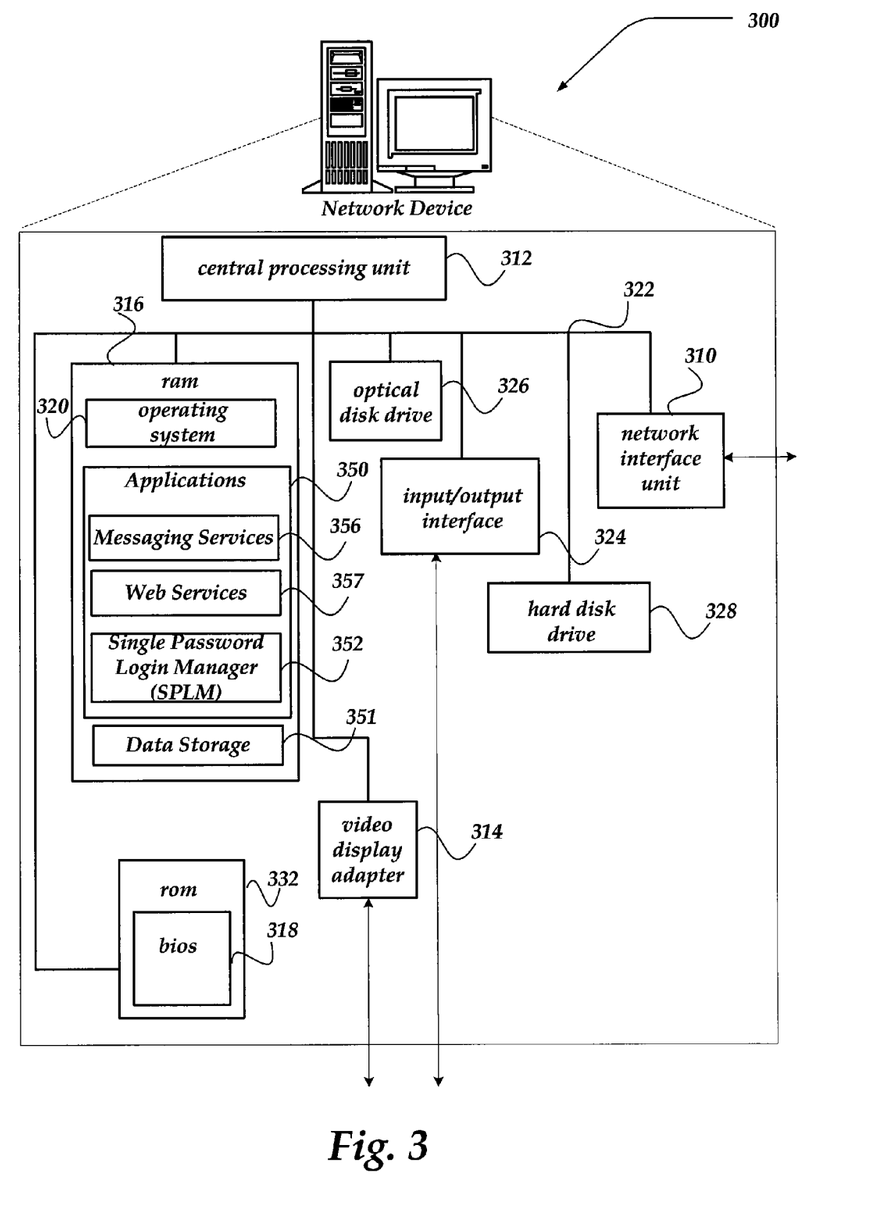
FIG. 3 shows one embodiment of a network device that may include a single use login manager.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, login services 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

As shown, data stores 352 may include a database, text, spreadsheet, folder, file, or the like, that may be configured to maintain and store information about users, user activities, services, statistical data, user names, account relationships, and the like In one embodiment, data stores 352 may also include registration information for a user that associates a user name, with an secured content/service account, a registered computing device for use in receiving single use passwords, and/or information useable in case the user's registered computing device or secured content is compromised. Data stores 352 are not limited to this information, and other information may also be managed through data stores 352. In one embodiment, at least some of data store 352 might also be stored on another component of network device 300, including, but not limited to cd-rom/dvd-rom 326, hard disk drive 328, or the like.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Web server 357, messaging server 356, and single password login manager (SPLM) 352 may also be included as application programs within applications 350.

Web server 357 represent any of a variety of services that are configured to provide content, including messages, over a network to another computing device. Thus, web server 357 includes for example, a web server, a File Transfer Protocol (FTP) server, a database server, a content server, or the like. Web server 357 may provide the content including messages over the network using any of a variety of formats, including, but not limited to WAP, HDML, WML, SMGL, HTML, XML, cHTML, xHTML, or the like. Thus, in one embodiment, web server 357 may be configured to enable a user to register for and/or use single use passwords. Moreover web server 357 may further enable a user to access secured content/services based on use of the single use passwords, as described in more detail below. Web server 357 may also be configured to provide messages, including alerts, or the like, to a user, as well as virtually any of variety of content to a user.

Messaging server 356 may include virtually any computing component or components configured and arranged to forward messages from message user agents, and/or other message servers, or to deliver messages to a local message store, such as data store 351, or the like. Thus, messaging server 356 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging server 356 may also be managed by one or more components of messaging server 356. Thus, messaging server 356 may also be configured to manage SMS messages, IM, MMS, IRC, RSS feeds, mIRC, or any of a variety of other message types. In one embodiment, messaging server 356 may enable users to initiate and/or otherwise request and/or receive a plurality of single use passwords configured to enable access to secured content/services.

SPLM 352 is configured to manage registration and login services for access to secured content/services. In one embodiment, SPLM 352 may provide user interfaces through web services 357 and/or messaging services 356 to enable a user to register for use of single use passwords for one or more accounts, secured sites, or the like.

SPLM 352 may receive information identifying a computing device for which the single use passwords are to be sent. The identification of the computing device might include an IP address, a phone number, an SMS address, IM address, email address, and/or other information. Moreover, in one embodiment, as part of the registration, SPLM 352 might send a message to the computing device useable to confirm receipt and to validate the computing device.

SPLM 352 may further receive a request for login by a user to a secured site, content, service, or the like. In one embodiment, the user might provide a user name. SPLM 352 may validate the user name, and/or send a request to another device or component to have a plurality of single use passwords sent to the registered computing device. SPLM 352 may also receive the plurality of single use passwords.

SPLM 352 may then provide one or more user interfaces to the user to request one of the provided passwords to be provided by the user as part of the login process. SPLM 352 may then validate the provided password and user name. SPLM 352 may further provide another request to the user for additional passwords from the plurality of single use passwords, as described further below in conjunction with process 500 of FIG. 5. If SPLM 352 determines through the use of the passwords, that the user is valid, SPLM 352 may enable the user to access the requested secured content/service.

Figure 4:
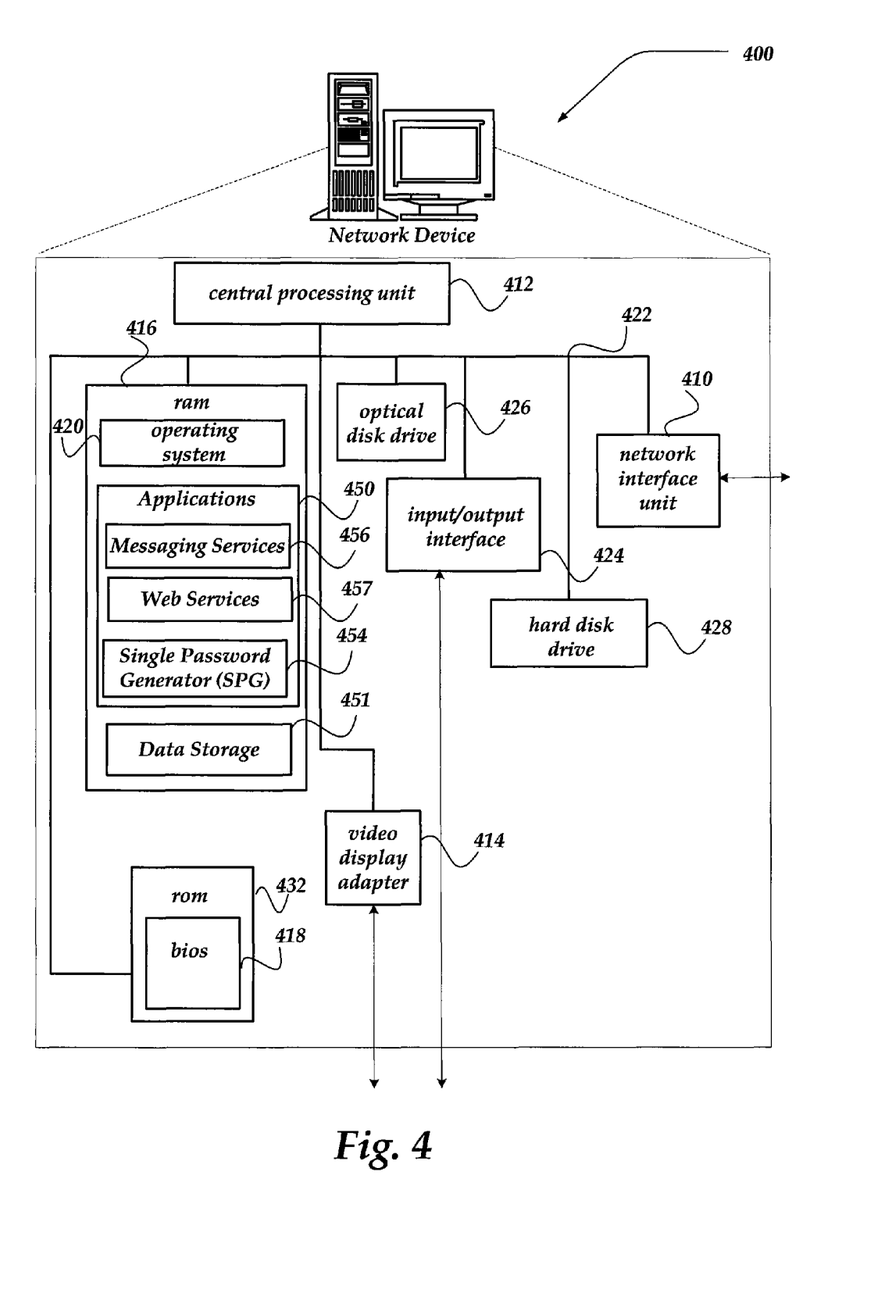
FIG. 4 shows one embodiment of a network device that may include a single password manager.

FIG. 4 shows one embodiment of a network device 400, according to one embodiment of the invention. Network device 400 may include many more or less components than those shown. The components shown, however, are sufficient to disclose an illustrative embodiment for practicing the invention. Network device 400 may represent, for example, SUPS 106 of FIG. 1. It should be noted, however, that while described as distinct network devices, functionality of network devices 300 and 400 may be combined into a single network device.

Thus, as illustrated in FIG. 4, network device 400 includes many of the same or similar components as described above for network device 300, each similar component being configured to operate in substantially the same as each other.

As shown, however, network device includes single password generator (SPG) 454 rather than SPLM 352. SPG 454 is configured to receive a request for a plurality of single use passwords. SPG 454 may store a plurality of data useable as single use passwords in data storage 451. However, in another embodiment, SPG 454 may generate the plurality of single use passwords upon request. That is, SPG 454 may employ a symbol generator, such as pseudo symbol generator, random number generator or the like, to generate a plurality of strings of symbols, or the like, useable as passwords. In one embodiment, SPG 454 may generate a set of five strings useable as passwords, where each string includes 4-7 symbols. However, the invention is not so limited, and other numbers of strings, length of strings, or the like, may also be used.

SPG 454 may then provide the plurality of single use passwords to a specified computing device over any of a variety of communication mediums, protocols, or the like. In one embodiment, SPG 454 may also provide the same plurality of single use passwords to a login service, such as login services 107 of FIG. 1. In one embodiment, SPG 454 may further provide a time period for which the plurality of single use passwords are to expire. In one embodiment, SPG 454 might generate the plurality of passwords upon each request, such that each generated plurality is considered to be unique within a given time period, such as weeks, months, or years.

Generalized Operation

Figure 5:
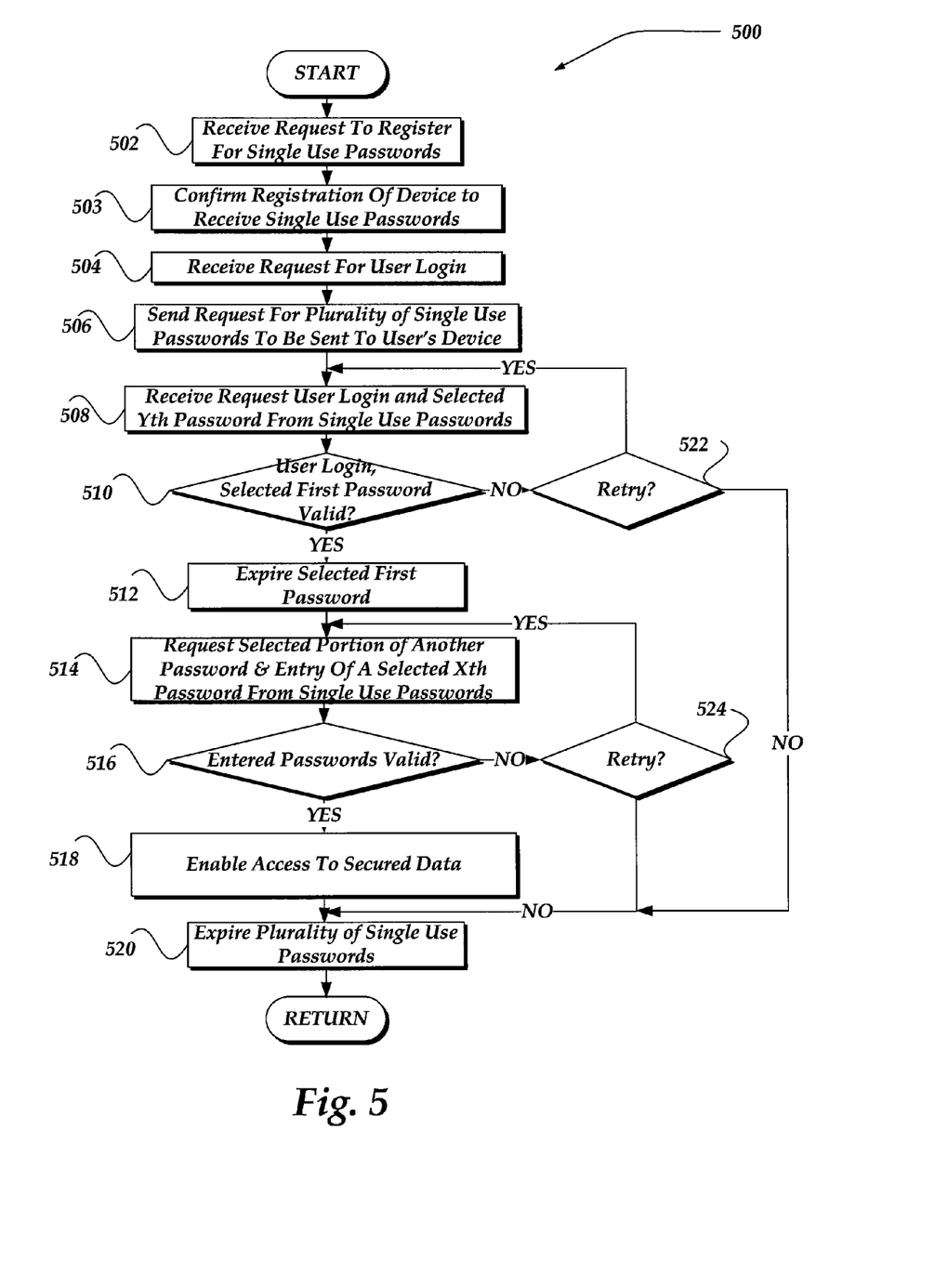
FIG. 5 illustrates a flow diagram generally showing one embodiment for a server process of managing authentication using a plurality of single use passwords.

The operation of certain aspects of the invention will now be described with respect to FIGS. 5-6. FIG. 5 illustrates a flow diagram generally showing one embodiment for a server process of managing authentication using a plurality of single use passwords. Process 500 of FIG. 5 may be implemented within login services 107 of FIG. 1.

As shown, process 500 begins, after a start block, at block 502, wherein a request is received to register for use of single use passwords. The request may include a user name or other unique identifier, along with a specification of a computing device, including, but not limited to a messaging address, such as an IM address, email address, SMS address, or the like, for which the plurality of single use passwords are to be sent. In one embodiment, the specification may further include a network address of the computing device useable to further validate the computing device. Registration may also include specification of which account, content, services, or the like, for which the single use passwords are to be used. In one embodiment, registration of a computing device, such as a mobile device, or the like, might be constrained to allowing only a single computing device to be associated with one account. Thus, a hacker might have to also obtain the physical computing device to hack into secured content/services.

Moreover, as noted above, registration may also include specification of a friend, family member, or the like, useable to further authenticate the registering user, should the user's registered computing device be compromised. In one embodiment, the user might employ another mechanism, such as a secret phrase, question/answer, or the like, to authenticate the user, should the user's registered computing device be compromised.

Processing flows next to block 503 where a confirmation message might be sent to the registered computing device, to confirm that the message is receivable, authenticate the messaging mechanism and the like. Assuming that the confirmation is authenticated, processing flows to block 504. In one embodiment, although not shown, if the messaging test is not confirmed, registration might be terminated. In that situation, processing might return to a calling process to perform other actions. It is noted that while process 500 illustrates a registration process with the login process, the invention is not limited to such arrangement. For example, in another embodiment, the registration embodied at least by blocks 502 and 503 may be performed separate from the login process. This is because, registration is typically considered as a one-time process, while login is typically viewed as a recurring process. Thus, subsequent actions by a user that has already registered might commence process 500 at block 504.

Thus, if confirmation is determined or a user has previously registered, processing proceeds to block 504, where the user may seek to login to access secured content/services. In one embodiment, the user might provide a login user name, and further request a plurality of single use passwords to be provided.

Moving to block 506, a request is sent to a single use password component to request that a plurality of single use passwords are sent to a registered computing device, associated with the user name. In one embodiment, the same plurality of single use passwords provided to the registered computing device is also received at block 506.

Figure 7:
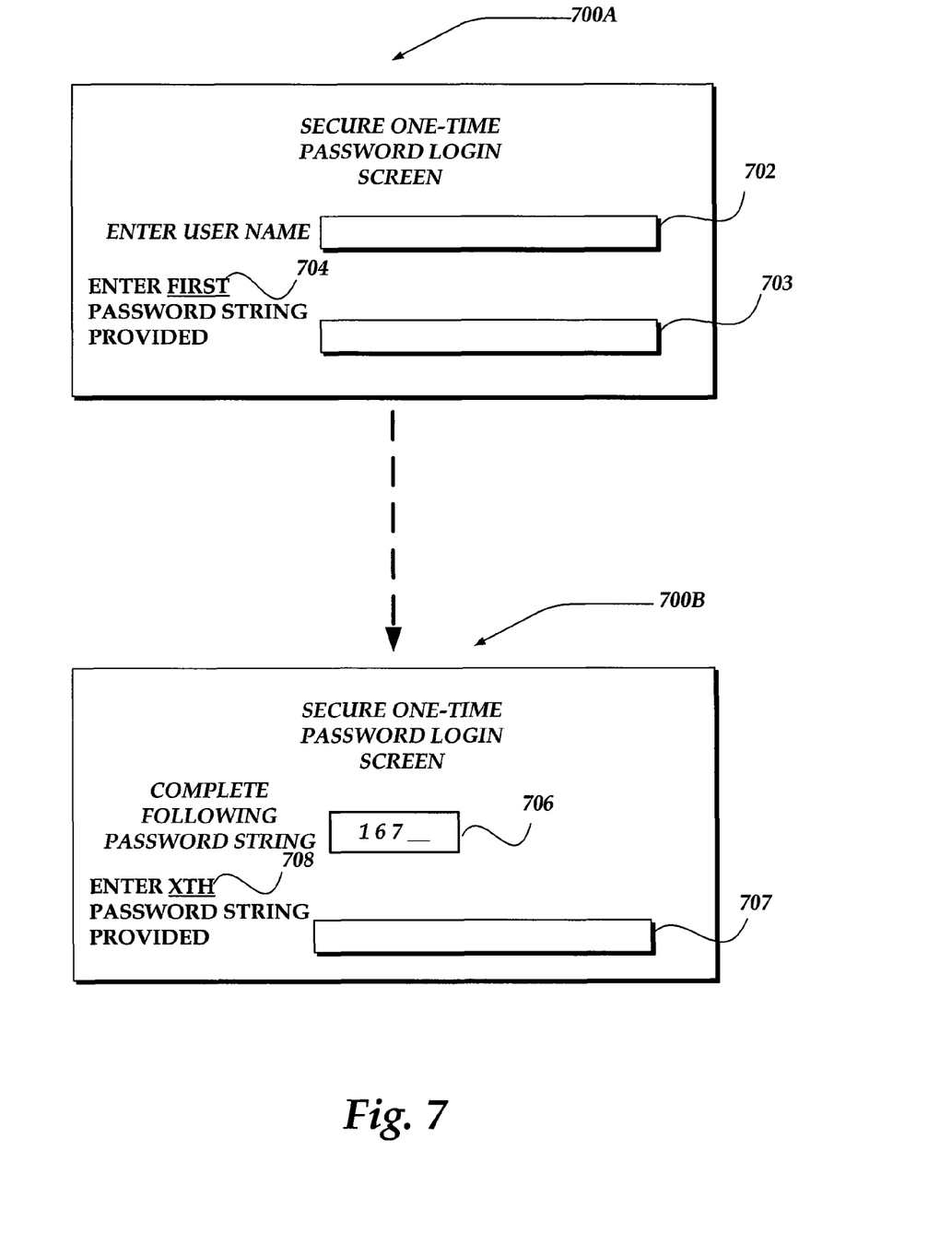
FIG. 7 illustrates one embodiment of a screen shot of a user interface for requesting single use passwords from a user.

Processing then flows to block 508, where a request to login using the user name is received. Referring briefly to FIG. 7, one embodiment of a screen shot of a user interface for requesting single use passwords from a user is illustrated as screen shot 700A. As shown, the user is provided with the ability to provide a user name within field 702 and one of the plurality of single use passwords within field 703. In one embodiment, the user may be requested to provide a first password from the plurality of single use passwords. That is, the plurality of single use passwords may be considered as an ordered set of passwords, where the first password might be considered as the first password in the plurality of single use passwords. In one embodiment, the user might be requested to provide a particular password from within the ordered sequence, such as the first password, a second password, or the like. Thus, the particular password requested might be specified within screen shot 700A as a password from any of the positions in the sequence. As shown, the specified password 704 in the ordered plurality is the FIRST password in the sequence.

Moving to decision block 510, a determination is made whether the user name, and provided selected password are valid. Recall, that the passwords are configured to expire after a defined time period. Therefore, at decision block 510, even should the user provide a correct password, if the passwords are determined to have expired, then the user name/selected password may be determined to be invalid. Moreover, should the user provide the wrong password in the sequence, even if it should be one of the passwords in the plurality of passwords, the password may still be determined to be invalid.

Thus, validation is time dependent, sequence dependent, and dependent upon the relationship between the user name and the plurality of single use passwords. If any of these situations are found to be invalid, processing flows to decision block 522; otherwise, processing flows to block 512.

At decision block 522, a determination is made whether to allow the user another attempt to login it. Another attempt might be allowed if the passwords have not expired, and based on policy, rules, number of tries attempted, or the like. For example, a limit on a number of retries might be implemented. In one embodiment, the user might have entered a password from the plurality, but not the selected one being requested to be entered. For example, the user might be requested to enter the first password, and instead inadvertently enters a third password, or the like. In such situations, in one embodiment, the user might be allowed to try again—assuming that the passwords have not expired. In one embodiment, if a re-try is allowed, processing flows back to block 508, where in one embodiment, a different one of the passwords in the sequence might be selected and requested for the user to enter. If no more retries are permitted, processing may branch to block 520.

At block 512, the first password validly entered by the user is expired. In this manner, a hacker, or the like, will be unable to use the password. Processing then flows to block 514, where a portion of one of the remaining passwords is displayed to the user. The user is requested to identify and enter the un-displayed portion of that password. Moreover, in one embodiment, the user may also be requested to enter another one of the remaining passwords specified to the user based on its position in the sequence of single use passwords. In one embodiment, the xth position may be randomly selected.

Referring to FIG. 7, screen shot 700B illustrates one embodiment of a user interface that may be used to request the portion of one of the remaining passwords, and for entry of another of the remaining passwords based on the password's position in the sequence. Thus, as illustrated, the user might be displayed a first portion of one of the passwords in field 706 and requested to enter the second portion of the password in field 706. By requesting that the user complete one of the password strings, the user is provided an opportunity to actively identify whether the site being accessed is authentic. This is directed towards preventing users from entering the passwords and/or other sensitive personal information before determining if the site being accessed is authentic.

Additionally, the Xth (708) password in the sequence may be requested to be entered into field 707. It should be noted, that while screen shot 700B illustrates both requests on a single screen interface, the invention is not so limited. Thus, in another embodiment, separate request screens may be presented to the user. Moreover, other arrangements of screen shot 700B might also be used. Thus, screen shot 700B (and screen shot 700A) should be considered as non-limiting, non-exhaustive examples, and others configurations may also be used, without departing from the scope of the invention.

Returning to process 500 of FIG. 5, processing flows to decision block 516, where a determination is made whether the user has provided a correct response for block 514 within the time period before the passwords expire. If so, processing flows to block 518; otherwise, processing flows to decision block 524. At decision block 524, similar to decision block 522, a determination is made whether to allow the user another attempt. In one embodiment, if another attempt is allowed, processing flows to block 514, where a different two passwords from the sequence might be used to challenge the user. If at decision block 524, if the user is not to be allowed another attempt, processing flows to block 520.

At block 518, the user is provided access to the requested secured content/services associated with the user name. Processing continues to block 520, where all of the passwords in the plurality of single use passwords for the user name are expired. Processing then returns to a calling process to perform other actions.

Figure 6:
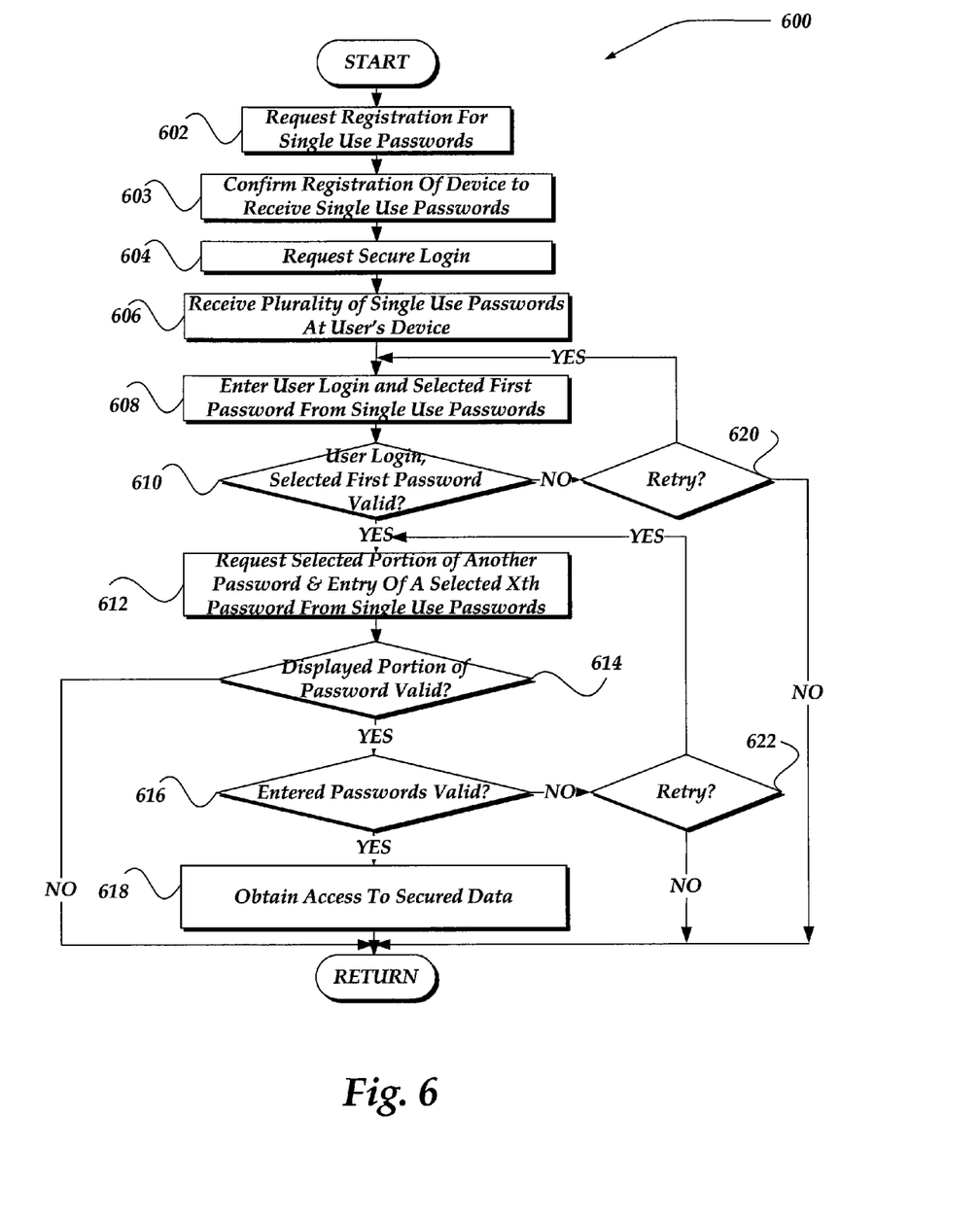
FIG. 6 illustrates a flow diagram generally showing one embodiment for a client process of employing a plurality of single use passwords for authentication and phishing detection.

FIG. 6 illustrates a flow diagram generally showing one embodiment for a client process of employing a plurality of single use passwords for authentication and phishing detection. Process 600 of FIG. 6 illustrates use of the plurality of single use passwords from a client device/user perspective.

Processing begins for process 600, after a start block, at block 602, if the user has not already registered. If the user has already registered, processing may skip to block 604 where the user may request to be logged in using the plurality of single use passwords.

At block 602, the user requests registration for use of single use passwords for a given user name, account, or the like. As described above, such registration includes providing information for where the plurality of single use passwords are to be sent, including, for example, an email address, SMS address, IM address, phone number, or the like. In one embodiment, the user might specify a network address associated with a specific computing device. Processing continues to block 603, wherein in one embodiment, the computing device that is registered is confirmed. This may be performed, as described above by sending a message to the address and receiving a confirmation return message, action, or the like. Processing then flows to block 604, if the user wishes to next log in. Otherwise, process 600 could be terminated at this juncture, such that registration and login may operate as separate activities.

At block 604, the user requests to login. Such action might include accessing over a network a webpage, or other interface configured to provide secure login services using the plurality of single use passwords. Processing continues next to block 606, where the user requests, and receives a plurality of single use passwords using the registered computing device, messaging mechanism, or the like. In one embodiment, the user might be notified that the user has a time period to use the passwords before they expire.

In any event, processing flows to block 608, where the user enters their user name, and is requested to provide one of the passwords. In one embodiment, the user might be requested to provide a first password in the sequence of passwords. In another embodiment, the user might be requested to provide a particular password based on its position in the sequence of passwords.

Continuing to decision block 610, a determination is made whether the user name, and provided password are valid. If valid, processing continues to block 612. If not, processing flows to decision block 620, where a determination is made whether to allow the user to retry. If a retry is allowed, processing loops back to block 608; otherwise, processing may return to a calling process to perform other actions.

At block 612, the user is provided with one or more interfaces and requested to provide a second portion of a password from the plurality of passwords given a display of a first portion of the password. In addition, the user may be requested to enter another password that is specified to the user based on its position in the sequence of passwords.

Processing flows to decision block 614, where at this juncture, the user might observe that the first portion of the password that is displayed to the user does not correlate with any portion of any of the provided passwords in the plurality of passwords that the user received at block 606. If the user determines that this is the case, then the user may suspect that phishing may be attempted. The user may then select to terminate further attempts to access their secured data using this site. In one embodiment, the user may select to further invalidate the plurality of passwords by seeking access to a valid site, or the like, and marking the passwords as invalid. In one embodiment, the user might further send a message to a validated site requesting that the passwords be invalidated. By invalidating the passwords, any login session created by the set of passwords may also become invalidated. Thus, if a hacker was to access the plurality of passwords, the hacker might be logged off based on the actions of the user.

Thus, processing would return to a calling process to perform other actions. Otherwise, if the portion of the displayed password does correlate with one of the passwords, the user may authenticate the site, and proceed to enter the requested password and portion of the other password. Processing then flows to decision block 616, where the user's entries are evaluated to determine if they are valid. If at decision block 616, the user's entries are determined to be valid and within the time period before the passwords expire, processing proceeds to block 618, where the user is allowed access to the secured content/services. Otherwise, if the user's entries are determined to be invalid, processing flows to decision block 622, where a determination is made whether to allow the user to retry logging in. If the user is to be allowed to retry, processing loops back to block 612; otherwise, processing may return to a calling process to perform other actions. When the process 600 returns, in one embodiment, and as described above in conjunction with process 500 of FIG. 5, the plurality of passwords are expired.

In one embodiment, at blocks 520 and 618 of processes 500 and 600 respectively, the user might be placed in a "restricted mode" in which the user may access secure content/services but might be unable to modify selected registration information, personal information, or the like. Thus, in one embodiment, the user might be unable to modify a password, birthday, registered computing device information, user name, of the like. In one embodiment, to modify such additional information, the user might be requested to perform additional security checks, including, but not limited to answering multiple security questions, being authenticated by a friend, or the like.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the flowchart block or blocks. In one embodiment, at least some of the operational steps may be performed serially; however, the invention is not so limited, and at least some steps may be performed concurrently.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
   a transceiver to send and receive data over a network; and
   a processor that is operative to perform actions, including:
     sending an ordered plurality of single use passwords to a requestor;
     receiving a request to access secured content or a secured service from the requestor;
     receiving from the requestor one password from the ordered plurality of single use passwords, wherein the requestor is instructed which one password of the ordered plurality of single use passwords based on a position in the ordered plurality of single use passwords;
     validating the received one password;
     based on the validation, displaying to the requestor a first portion of another password from the ordered plurality of single use passwords and requesting that the requestor provide a second portion of the other password, and further requesting that the requestor provide still another password from the ordered plurality of single use passwords, wherein the still other password is specified to the requestor based on a position within the ordered plurality of single use passwords; and
     if the requestor provides a correct second portion of the other password and still other password, enabling access to the secured content or service.

2. The network device of claim 1, wherein the processor that is operative to perform actions, including:
   expiring the received one password upon validation of the received one password or after a defined time period; and
   expiring each of the other passwords in the ordered plurality of single use passwords after the defined time period.

3. The network device of claim 1, wherein if the first portion of the other password is determined not to match any portion of any of the ordered plurality of single use passwords, then detecting that the requester is being phished.

4. The network device of claim 1, wherein the ordered plurality of single use passwords comprises at least four passwords.

5. The network device of claim 1, wherein sending the ordered plurality of single use passwords to the requester further comprises sending the ordered plurality of single use passwords to a registered computing device using a specified messaging service, including at least one of email, SMS, IM, VOIP, or voice.

6. The network device of claim 1, wherein validating the received one password further comprises validating that the one password is received within an expiration time period.

7. A system that is operative to manage a secured access over a network, comprising:
- a password component within a first network device configured to provide an ordered plurality of single use passwords to a computing device, the ordered plurality of single use passwords being configured to expire after a defined time period; and
- a login service component within a second network device configured to perform actions, including:
  - receiving a request from a requester for access to secured content or service;
  - receiving a password from the ordered plurality of single use passwords, the password being requested from the requestor based on a position within the ordered plurality of single use passwords;
  - determining that the received password is valid for the requestor;
  - requesting another password to be provided, wherein the other password is identified to the requestor based on another position within the ordered plurality of single use passwords;
  - requesting the requester provide a missing portion of yet another password from the ordered plurality of single use passwords by providing to the requestor a first portion of the yet another password;
  - receiving the missing portion of the yet another password, and the other password;
  - if the missing portion and other password are determined to be valid, enabling access to the secured content or service by the requester.

8. The system of claim 7, wherein determining that the received password is valid further comprises determining if the password is received within the defined time period.

9. The system of claim 7, wherein the login service component is configured to perform actions, further including:
- determining if any of the received password, missing portion of the yet another password, or other password is received outside of the defined time period; and
- if so, inhibiting access to the secured content or service.

10. The system of claim 7, wherein the ordered plurality of single use passwords comprises at least four passwords, each password being randomly generated.

11. The system of claim 7, wherein the ordered plurality of single use passwords are provided to the computing device, wherein the computing device is registered to the requestor during a registration process.

12. A non-transitory computer-readable storage medium having computer-executable instructions, the computer-executable instructions when installed onto a computing device enable the computing device to perform actions, comprising:
- receiving a request from a requestor for access to secured content or service;
- receiving a password from an ordered plurality of single use passwords, the password being requested from the requestor based on a position within the ordered plurality of single use passwords;
- determining that the received password is valid for the requestor;
- requesting another password to be provided, wherein the other password to be provided is identified to the requestor based on another position within the ordered plurality of single use passwords;
- requesting the requestor provide a missing portion of yet another password from the ordered plurality of single use passwords by providing to the requestor a first portion of the yet another password;
- receiving the missing portion of the yet another password, and the other password;
- if the missing portion and other password are determined to be valid, enabling access to the secured content or service by the requestor.

13. The non-transitory computer-readable storage medium of claim 12, wherein each password requested from the requestor is randomly selected from the ordered plurality of single use passwords, wherein no password is requested more than once.

14. The non-transitory computer-readable storage medium of claim 12, wherein each password is configured to expire either upon a first use or after a defined time period.

15. The non-transitory computer-readable storage medium of claim 12, wherein if the requestor determines that the first portion of yet another password does not match any portion of any of the ordered plurality of single use passwords, then detecting an attempt to phish access to secure data.

16. The non-transitory computer-readable storage medium of claim 12, enabling the requestor to mark any of the passwords as invalid.

17. A method of performing secure access over a network using a network device that is operative to perform actions, comprising:
- sending an ordered plurality of single use passwords to a requestor, wherein the passwords expire upon first use or after a defined time period;
- receiving from the requestor one password from the ordered plurality of single use passwords, wherein the requester is directed which one password of the ordered plurality of single use passwords to provide based indicating to the requestor a position in the ordered plurality of single use passwords from which to select the one password;
- validating the received one password;
- based on a result of the validation, displaying to the requestor a first portion of another password from the ordered plurality of single use passwords and requesting that the requestor provide a second portion of the other password, and further requesting that the requestor provide still another password from the ordered plurality of single use passwords, wherein the still other password is specified to the requestor based on a position within the ordered plurality of single use passwords; and
- if the requestor provides a correct second portion of the other password and the still other password, enabling access to secured content or service.

18. The method of claim 17, further comprising:
- randomly selecting the one password that the requestor is to provide from the ordered plurality of single use passwords;
- randomly selecting the still other password from the ordered plurality of single use passwords without reselecting the one password; and
- randomly selecting the other password from the ordered plurality of single use passwords without reselecting the one password or the still other password.

19. The method of claim 17, wherein validating the received one password further comprises, inhibiting access to the secured content or service if the one password is received from the requester outside of the expiration time period.

20. The method of claim 17, wherein inhibiting access to the secured content or service if the requestor provides a correct second portion of the other password and the still other password outside of the expiration time period.

* * * * *